US012688808B2

(12) United States Patent
Misumi et al.

(10) Patent No.: US 12,688,808 B2
(45) Date of Patent: Jul. 21, 2026

(54) OPERATION SUPPORT SYSTEM

(71) Applicant: HONDA MOTOR CO., LTD., Tokyo (JP)

(72) Inventors: Yoshiyuki Misumi, Wako (JP); Satoshi Fujii, Wako (JP); Mami Tanaka, Wako (JP); Keiichi Arai, Wako (JP); Mio Oshima, Wako (JP); Hiroyuki Yamamoto, Wako (JP); Tsuyoshi Harada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 116 days.

(21) Appl. No.: 18/441,065

(22) Filed: Feb. 14, 2024

(65) Prior Publication Data

US 2025/0259579 A1 Aug. 14, 2025

(51) Int. Cl.
*G09G 3/00* (2006.01)
*B63B 49/00* (2006.01)

(52) U.S. Cl.
CPC ............... *G09G 3/03* (2020.08); *B63B 49/00* (2013.01); *G09G 2320/0242* (2013.01); *G09G 2320/068* (2013.01); *G09G 2340/10* (2013.01); *G09G 2340/12* (2013.01); *G09G 2354/00* (2013.01)

(58) Field of Classification Search
CPC .. G09G 3/03; G09G 2340/10; G09G 2340/12; G09G 2354/00; B63B 49/00
See application file for complete search history.

(56) References Cited

U.S. PATENT DOCUMENTS

2008/0094252 A1* 4/2008 Uhler ................. B62D 15/0275 340/932.2
2020/0057488 A1* 2/2020 Johnson .................. G06T 19/20
2020/0369351 A1 11/2020 Behrendt et al.
2023/0195118 A1* 6/2023 Singh ...................... B63B 79/15 701/21

FOREIGN PATENT DOCUMENTS

DE 10109350 A1 * 9/2001 ......... B62D 15/0275

* cited by examiner

*Primary Examiner* — Antonio A Caschera
(74) *Attorney, Agent, or Firm* — Amin, Turocy & Watson, LLP

(57) ABSTRACT

An operation support system according to an embodiment including: a display mounted in a watercraft; and a display control unit causing a first view that is an image of the vicinity of the watercraft and a second view of an angle different from that of the first view to be displayed on the display, in which the display control unit: superimposes a first object simulating the watercraft and a line-shaped second object onto the second view; superimposes a third object representing a positional relation between an obstacle in the vicinity of the watercraft and the watercraft onto the first view; causes a type of the second object to be different in a case in which the positional relation satisfies a predetermined condition and in a case in which the positional relation does not satisfy the predetermined condition; and superimposes the second object of a type similar to that of the predetermined condition represented by the third object onto the first view.

12 Claims, 10 Drawing Sheets

OPERATION SUPPORT SYSTEM

BACKGROUND

Field of the Invention

The present invention relates to an operation support system.

Description of Related Art

In recent years, initiatives have been made to provide access to sustainable transportation systems that take into account the increasing number of vulnerable traffic participants such as entry-level users (for example, see United States Patent Application Publication No. 2020/0369351).

SUMMARY

With regard to transportation systems, in the operation of a watercraft such as a ship, there is a large blind spot from a cockpit, which may cause anxiety for entry-level users. The present invention has been realized in view of such circumstances, and one objective thereof is to provide an operation support system allowing anyone to easily operate a watercraft by providing visual support that can be easily and intuitively understood by a user.

An operation support system according to the present invention employs the following configurations.

(1) A first example of the present invention is an operation support system including: a display mounted in a watercraft; and a display control unit causing a first view that is an image of the vicinity of the watercraft and a second view that is an image of the vicinity of the watercraft of an angle different from that of the first view to be displayed on the display, wherein the display control unit: superimposes a first object simulating the watercraft and one or a plurality of line-shaped second objects disposed in the vicinity of the first object onto the second view; superimposes a third object representing a positional relation between an obstacle in the vicinity of the watercraft and the watercraft onto the first view; causes a type at least at the time of displaying the second object to be different in a case in which the positional relation satisfies a predetermined condition and in a case in which the positional relation does not satisfy the predetermined condition; and superimposes the second object of a type similar to that of the predetermined condition represented by the third object onto the first view.

(2) According to a second example of the present invention, in the operation support system of the first example, a relative distance between the watercraft and the obstacle being a predetermined distance or less is included in the predetermined condition, and the display control unit causes more highlighted display of the second object to be performed in a case in which the relative distance is the predetermined distance or less than in a case in which the relative distance exceeds the predetermined distance.

(3) According to a third example of the present invention, in the operation support system of the first example, a reference distance, which is a distance based on a speed of the watercraft, being a predetermined distance or less is included in the predetermined condition, and the display control unit performs more highlighted display of the second object in a case in which the reference distance is the predetermined distance or less than in a case in which the reference distance exceeds the predetermined distance.

(4) According to a fourth example of the present invention, in the operation support system of the first example, a collision prediction time between the watercraft and the obstacle being a predetermined time or less is included in the predetermined condition, and the display control unit performs more highlighted display of the second object in a case in which the collision prediction time is the predetermined time or less than in a case in which the collision prediction time exceeds the predetermined time.

(5) According to a fifth example of the present invention, in the operation support system of the first example, a first predetermined condition and a second predetermined condition that is more unlikely to be satisfied than the first predetermined condition are included in the predetermined condition, and the display control unit performs more highlighted display of the second object and the third object in a case in which the positional relation satisfies the second predetermined condition than in a case in which the positional relation satisfies the first predetermined condition.

(6) According to a sixth example of the present invention, in the operation support system of the first example, the display control unit causes the second object to be displayed at each of mutually-different positions in the vicinity of the first object.

(7) According to a seventh example of the present invention, in the operation support system of the sixth example, the display control unit causes the second object to be displayed on a lateral side of the first object and causes the second object to be displayed in front of or behind the first object.

(8) According to an eighth example of the present invention, in the operation support system of the seventh example, a left side and a right side are included in the lateral side.

(9) According to a ninth example of the present invention, in the operation support system of the first example, the first view acquired by imaging a side in front of the watercraft, the first view acquired by imaging a side to the rear of the watercraft, and the first view acquired by imaging a lateral side of the watercraft are included in the first view.

(10) According to a 10th example of the present invention, in the operation support system of the first example, the display control unit causes the display to display the first view in which a direction, in which the obstacle of which the positional relation with the watercraft satisfies the predetermined condition is present, is imaged among a plurality of the first views.

(11) According to an 11th example of the present invention, in the operation support system of the first example, the display control unit causes the second object to be displayed on an outer edge of the first object.

(12) According to a 12th example of the present invention, in the operation support system of the first example, the display control unit superimposes a fourth object with a circular shape representing a rudder angle of a propeller of the watercraft onto the second view and causes the first object and the second object to be displayed on an inner side of the fourth object.

(13) According to a 13th example of the present invention, in the operation support system of the first example, in a case in which the positional relation satisfies the predetermined condition, the display control unit changes a color of the second object to a predetermined color corresponding to the predetermined condition.

(14) According to a 14th example of the present invention, in the operation support system of the first example, in a case in which the positional relation satisfies the predetermined condition, the display control unit changes a line of the second object to a predetermined line corresponding to the predetermined condition.

According to one of the examples described above, visual support that can be easily and intuitively understood by a user can be performed, and as a result, anyone can easily operate a watercraft.

DESCRIPTION OF EMBODIMENTS

Hereinafter, an operation support system according to an embodiment of the present invention will be described with reference to the drawings.

Configuration of Watercraft

Figure 1:
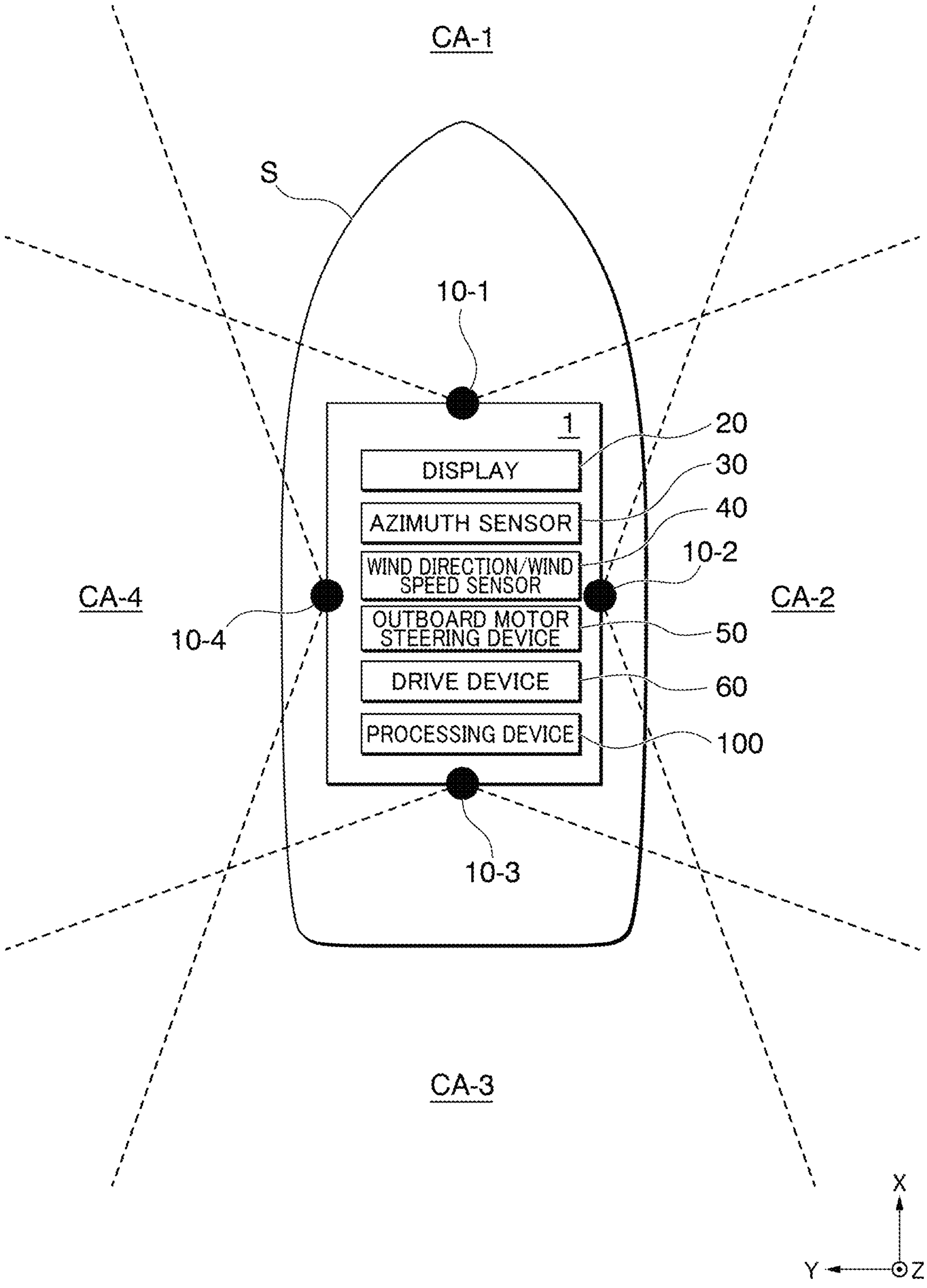
FIG. 1 is a diagram illustrating a whole watercraft according to an embodiment.

FIG. 1 is a diagram illustrating a whole watercraft S according to an embodiment. Although the watercraft S is, typically, a ship such as a pontoon ship, an offshore ship, a V-hull boat ship, or a run-about ship, it is not limited thereto and may be any other mobile body such as a jet ski.

An operation support system 1 is mounted in the watercraft S. The operation support system 1, for example, includes a plurality of cameras 10, a display 20, an azimuth sensor 30, a wind direction/wind speed sensor 40, an outboard motor steering device 50, a drive device 60, and a processing device 100.

Figure 2:
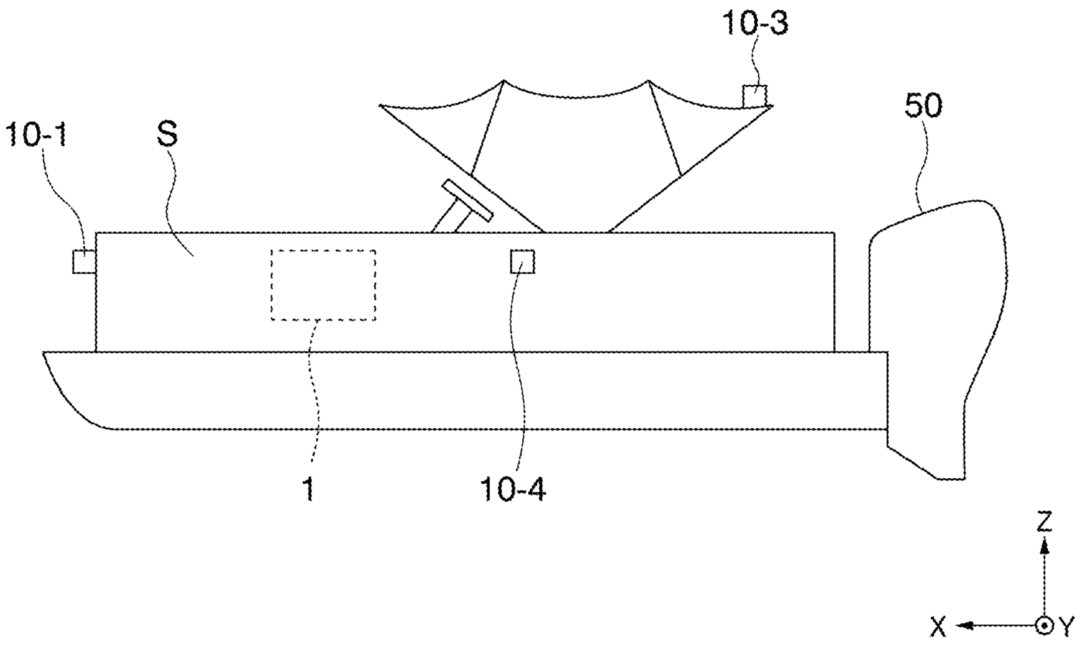
FIG. 2 is a diagram illustrating one example of installation positions of cameras according to an embodiment.

FIG. 2 is a diagram illustrating one example of installation positions of cameras 10 according to an embodiment. As illustrated in the drawing, the cameras 10, for example, may be configured such that one camera is installed on each of a front side, a rear side, a right side, and a left side of a body of a watercraft S. For example, the cameras 10 adjacent to each other such as a front-side camera 10-1 and a right-side camera 10-2, and the right-side camera 10-2 and a rear-side camera 10-3 are arranged such that parts of imaging areas overlap each other. For example, the front-side camera 10-1 may be disposed at a tip end of the watercraft S, the right-side camera 10-2 and the left-side camera 10-4 may be disposed on outer walls of lateral sides of an operation room, and the rear-side camera 10-3 may be disposed in a roof rear part of the operation room. For example, a plurality of cameras 10 may be installed at each place. The camera 10 can image the vicinity of the watercraft S and can image a place at an arbitrary distance from the watercraft S to a place at further another arbitrary distance. The camera 10, for example, can image a place at the distance of 30 [cm] from the watercraft S to a place at the distance of 30 [m]. FIGS. 1 and 2 illustrate four cameras 10-1 to 10-4, and imaging ranges CA-1 to CA-4 of imaging units are illustrated. Hereinafter, an image of the vicinity of the watercraft S imaged by each camera 10 will be referred to as "oblique view" in description. In addition, various kinds of image processing (contrast correction, brightness correction, noise removal, edge enhancement, enlargement, reduction, trimming, and the like) may be performed on the oblique view. The oblique view before the image processing is one example of "first view", and the oblique view after the image processing is another example of "first view".

The display 20 displays an image generated by the processing device 100, a graphical user interface (GUI) for accepting various input operations from a user, and the like. For example, the display 20 is a liquid crystal display (LCD), an organic electroluminescence (EL) display, or the like. In a case in which the display 20 is caused to function as a GUI, the display 20 may be a touch panel.

The display 20, for example, is installed in an operation room. In the operation room, a single display 20 may be installed, or a plurality of displays 20 may be installed. A screen of the display 20 may be either flat or curved. Although the contour of the screen of display 20 is typically rectangular, it is not limited to this and may also be in other shapes such as triangular, circular, or elliptical.

The azimuth sensor 30, for example, includes a gyro sensor, a magnetic sensor, and the like. The azimuth sensor 30 measures an azimuth.

The wind direction/wind speed sensor 40 measures a wind direction and a wind speed of the surroundings of the watercraft S.

The outboard motor steering device 50, for example, is attached to a rear end of the watercraft S. The outboard motor steering device 50 generates a propulsion force for the watercraft S and adjusts the angle of the rudder (that is, a rudder angle) of the watercraft S.

The drive device 60 drives the outboard motor steering device 50 using fuel such as gasoline, electric power charged in a battery, or the like.

The processing device 100, for example, generates an image for supporting an operation of an operator (occupant) of the watercraft S using an image of the vicinity of the watercraft S, that is, an oblique view imaged by each camera 10 and causes the display 20 to display the generated image.

Configuration of Processing Device

Figure 3:
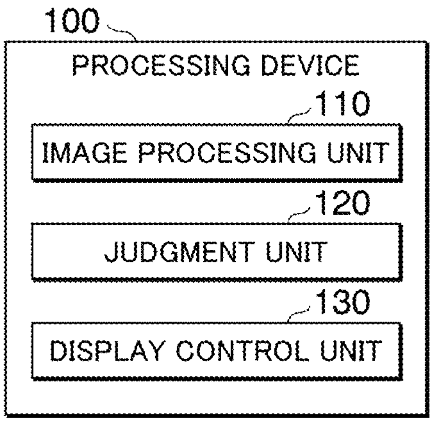
FIG. 3 is a configuration diagram of a processing device according to an embodiment.

FIG. 3 is a configuration diagram of the processing device 100 according to the embodiment. The processing device 100, for example, includes an image processing unit 110, a judgment unit (determination unit) 120, and a display control unit 130. Such constituent elements, for example, are realized by a hardware processor such as a central processing unit (CPU) executing a program (software). Some or all of such constituent elements may be realized by hardware (a circuit unit; including circuitry) such as a large scale integration (LSI), an application specific integrated circuit (ASIC), a field-programmable gate array (FPGA), a graphics processing unit (GPU), or a system on chip (SOC) or may be realized by software and hardware in cooperation. The program may be stored in a storage device (a storage device including a non-transitory storage medium) such as a hard disk drive (HDD) or a flash memory in advance or may be stored in a loadable/unloadable storage medium (a non-transitory storage medium) such as a DVD or a CD-ROM and be installed by mounting the storage medium in a drive device.

Process Flow of Processing Device

Figure 4:
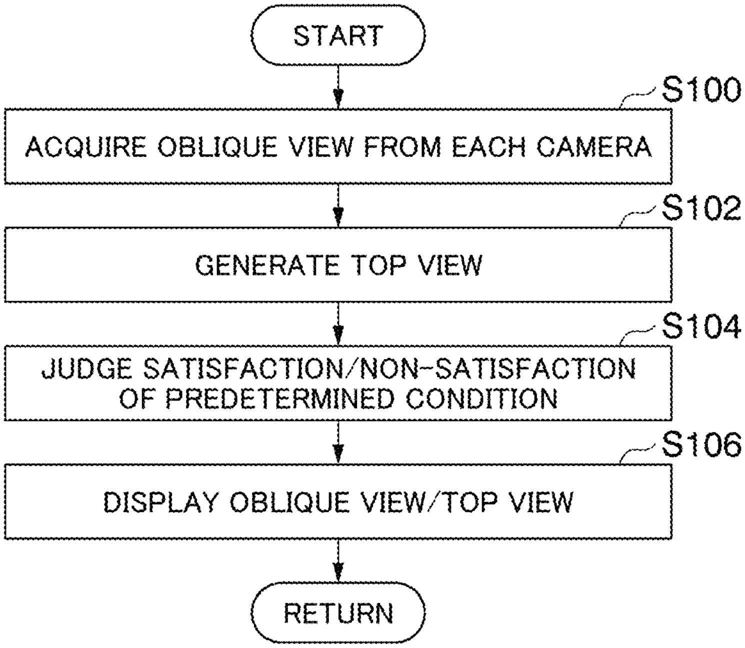
FIG. 4 is a flowchart illustrating a flow of a series of processes of a processing device according to an embodiment.

Hereinafter, the process of each constituent element of the processing device 100 will be described on the basis of a flowchart. FIG. 4 is a flowchart illustrating a flow of a series of processes of the processing device 100 according to the embodiment. The process of this flowchart may be repeatedly performed with a predetermined period.

First, the image processing unit 110 acquires an oblique view from each of a plurality of cameras 10 (Step S100). In other words, the image processing unit 110 acquires an oblique view of the front side of the watercraft S from the front-side camera 10-1, acquires an oblique view of the right side of the watercraft S from the right-side camera 10-2, acquires an oblique view of the left side of the watercraft S from the left-side camera 10-4, and acquires an oblique view of the rear side of the watercraft S from the rear-side camera 10-3.

Next, by performing a predetermined process for the oblique view of each of the plurality of cameras 10, the image processing unit 110 generates an image acquired by looking down the watercraft S from the top (hereinafter, referred to as a top view) from a plurality of oblique views. The top view is one example of "second view".

Here, calibration used for generating a top view from oblique views will be described. A manager of the watercraft S performs calibration in advance on land or the like. The manager installs calibration boards at a height at which a watercraft S actually drafts water and measures coordinates of installation points of the calibration boards.

Figure 5:
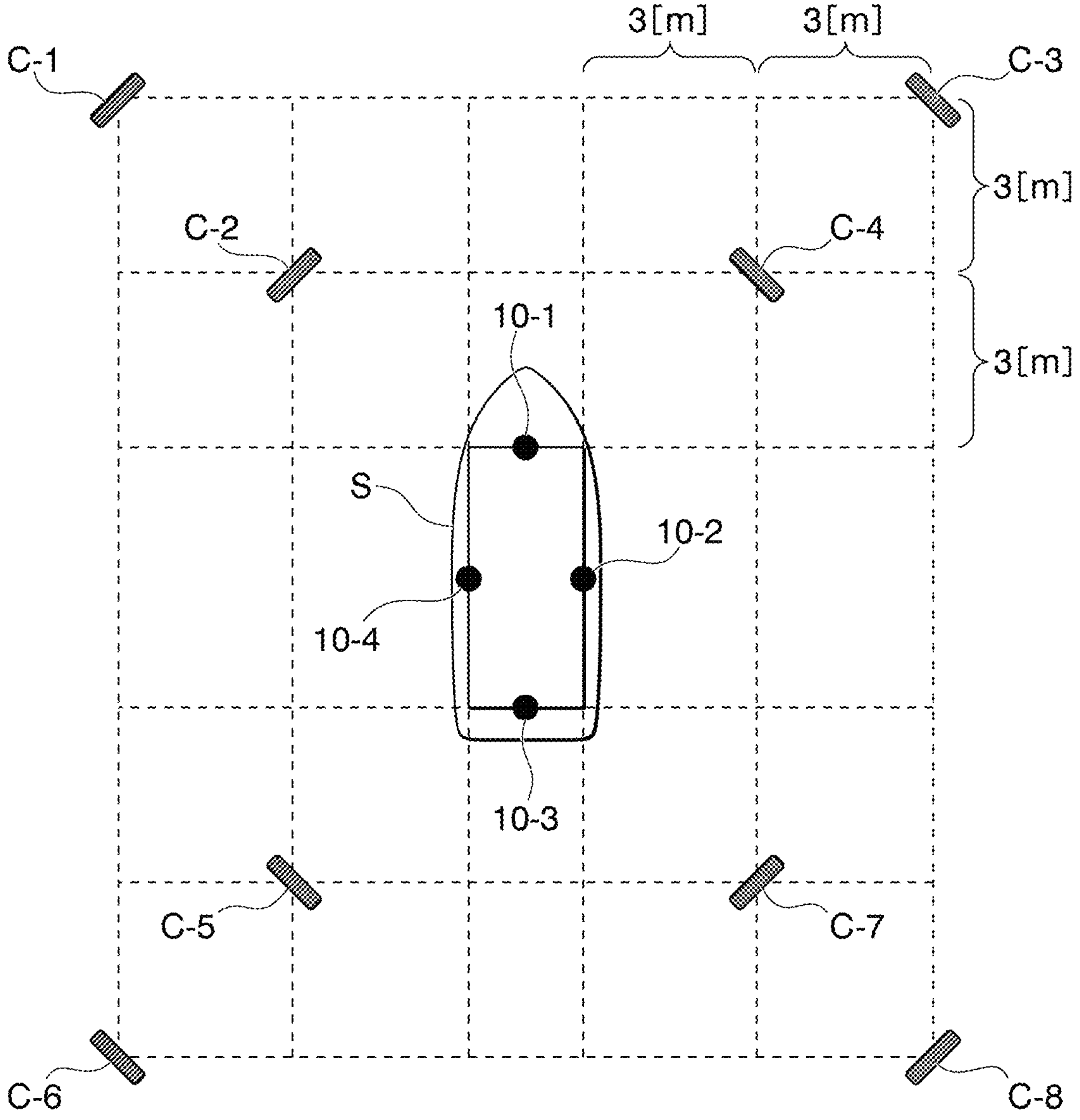
FIG. 5 is an example illustrating one example of installation points of calibration boards.

FIG. 5 is an example illustrating one example of installation points of calibration boards. The coordinates, for example, are partitioned into sections of 3 [m]×3 [m] having the watercraft S as its center. The watercraft S, for example, includes four cameras 10. The installation points C-1 to C-8 of the calibration boards are illustrated. A manager photographs images in the vicinity of the watercraft S using the four cameras 10. The photographed images are stored in an electronic control unit (ECU) (not illustrated) and are conveyed to another device using a universal serial bus (USB) memory or the like. The other device is a computer device that can perform calibration. A manager measures coordinates of the calibration boards in an image.

The manager calculates three-dimensional coordinates using the principle of epipolar matching. In the epipolar matching, the coordinates of calibration boards in a real space and the coordinates of the calibration boards in an image are set as input information, a virtual perpendicular line is drawn in a three-dimensional space from coordinates of a plane of the camera 10, and an intersection between the virtual perpendicular line and a virtual perpendicular line from the coordinates of the plane of another camera 10 is set as three-dimensional coordinates. The manager installs information of the three-dimensional coordinates in the image processing unit 110. In accordance with this, the image processing unit 110 can convert oblique views imaged by the cameras 10 into a top view.

The description of the flowchart will be continued. Next, the judgment unit 120 judges (the determination unit 120 determines) whether or not a positional relation between an obstacle present in the vicinity of the watercraft S and the watercraft S satisfies a predetermined condition using the top view generated by the image processing unit 110 (Step S104).

The obstacle, for example, is another watercraft, a dock, a trailer, a person, a floating object or the like.

First, for example, by inputting oblique views or a top view to a first machine learning model that has been generated in advance using a technique such as machine learning or the like and has learned to output presence and a type of an obstacle when an image is input thereto, the judgment unit 120 detects obstacles in the vicinity of the watercraft S.

The first machine learning model is a machine learning model that has been trained on the basis of a training data set associated with presence and a type of an obstacle as a label (also referred to as a target) for images such as oblique views or a top view. The first machine learning model trained in this way outputs presence and a type of an obstacle in accordance with input of images such as oblique views or a top view.

The first machine learning model is a model to which an algorithm of machine learning such as supervised learning or a regression analysis is applied. The first machine learning model, for example, may be implemented using a deep neural network or may be mounted using polynomial regression, multiple regression, support vector regression, random forest regression, or the like.

Furthermore, by inputting a top view generated by the image processing unit 110 to a second machine learning model that has been trained in advance to output a position (coordinates) of an obstacle when a top view is input, the judgment unit 120 identifies a position of an obstacle present in the vicinity of the watercraft S.

The second machine learning model is a machine learning model that has been trained on the basis of a training data set associated with a position (coordinates) of an obstacle as a label (also referred to as a target) for a top view. The second machine learning model trained in this way outputs a position (coordinates) of an obstacle in accordance with input of a top view. The position (coordinates) of the obstacle, for example, represents using a position of a point on a plane that is partitioned as one grid of 10 [cm].

The second machine learning model, similar to the first machine learning model, may be implemented using a deep neural network or may be mounted using polynomial regression, multiple regression, support vector regression, random forest regression, or the like.

The judgment unit 120 judges whether or not the positional relation between an obstacle of which the position has been identified using the second machine learning model and the watercraft S satisfies a predetermined condition.

In the predetermined condition, for example, (i) a relative distance between the watercraft S and an obstacle being a predetermined distance or less, (ii) a reference distance (for example, a speed x several seconds) that is a distance based on a speed of the watercraft S being a predetermined distance or less, (iii) a collision prediction time of the watercraft S and an obstacle (a value acquired by dividing the relative distance between the watercraft S and the obstacle by the relative speed between the watercraft S and the obstacle) being a predetermined time or less, and the like are included. In the predetermined condition, a condition of a logical product or a logical sum of (i) to (iii) may be included.

Furthermore, in the predetermined condition, a first predetermined condition and a second predetermined condition that is more unlikely to be satisfied than the first predetermined condition may be included. In such a case, for example, the predetermined distance of (i) or (ii) is set to 3 [m] in the first predetermined condition, and the predetermined distance of (i) or (ii) is set to 1 [m] in the second predetermined condition. Similarly, for example, the predetermined time of (iii) is set to 10 [seconds] in the first predetermined condition, and the predetermined time of (iii) is set to 5 [seconds] in the second predetermined condition. These numerical values are merely examples and can be arbitrarily changed.

In other words, the judgment unit 120 identifies a position of an obstacle from a top view using the second machine learning model, furthermore calculates a relative distance, a reference distance, a collision prediction time, or the like as a positional relation between the obstacle and the watercraft S, and judges whether or not these calculated indexes satisfy the conditions of (i) to (iii).

Furthermore, in a case in which the predetermined condition is further divided into a first predetermined condition and a second predetermined condition, the judgment unit 120 judges whether or not indexes such as a relative distance, a reference distance, and a collision prediction time satisfy each of the first predetermined condition and the second predetermined condition.

The judgment unit 120, for example, performs the judgment described above for each of areas acquired by dividing a top view into four parts including front, rear, left, and right divisions. The divided areas, for example, may be divided into eight parts including front, rear, left, right, and diagonal divisions. Areas for which the first predetermined condition and the second predetermined condition are judged may be areas divided into different number of parts.

The description of the flowchart will be continued. Next, the display control unit 130 causes the display 20 to display one of an oblique view and a top view or both the oblique view and the top view (Step S106). An image object of a different type is superimposed on each of these views in accordance with requirement or non-requirement of satisfaction of a predetermined condition. In accordance with this, the process of this flowchart ends.

Screen Example of Display

Figure 6:
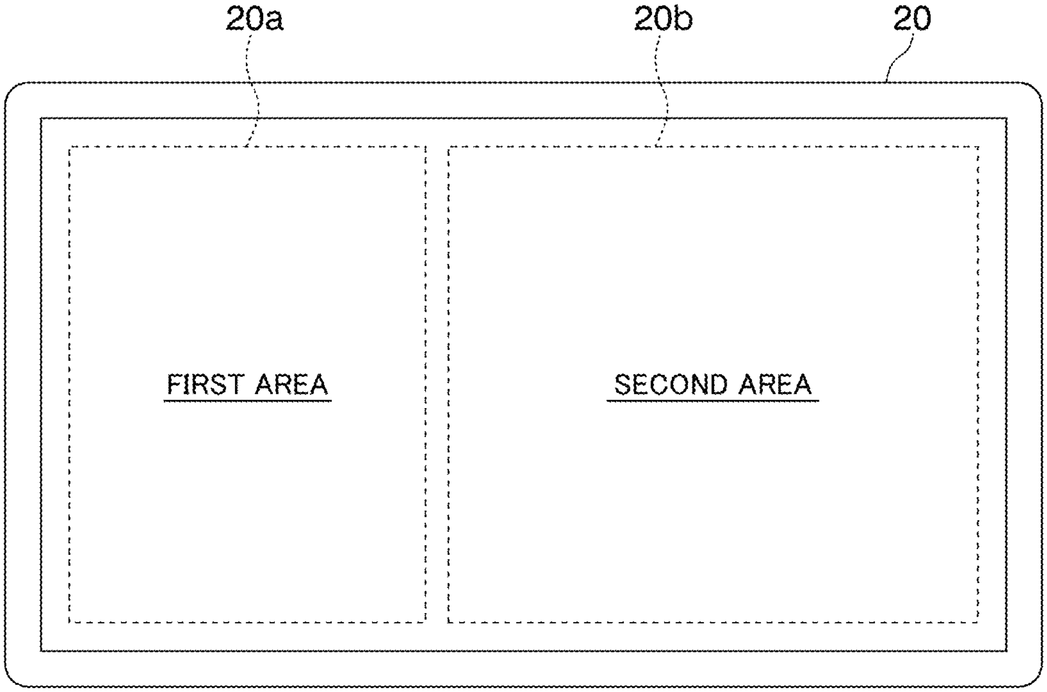
FIG. 6 is a diagram illustrating one example of a screen of a display according to an embodiment.

Hereinafter, a screen example of the display 20 according to this embodiment will be described. FIG. 6 is a diagram illustrating one example of a screen of the display 20 according to an embodiment. As illustrated in the drawing, the screen of the display 20 is divided into a first area 20*a* and a second area 20*b*. For example, one of an oblique view and a top view is displayed in the first area 20*a*, and the other thereof is displayed in the second area 20*b*. In addition, on the entire screen of the display 20 in which the first area 20*a* and the second area 20*b* are aligned, a top view is displayed, or an oblique view is displayed.

For example, when the top view is displayed on the display 20 as a process of S106 described above, the display control unit 130 superimposes a ship object OB1 and a virtual line object OB2 on the top view.

The ship object OB1 is an image object simulating a watercraft S. The virtual line object OB2 is one or a plurality of line-shaped image objects disposed in the vicinity of the ship object OB1 and is an image object representing a positional relation between the watercraft S and an obstacle.

In addition, the display control unit 130 may superimpose the ship object OB1 and the virtual line object OB2 also on the oblique view in addition to the top view. The ship object OB1 is one example of "first object", and the virtual line object OB2 is one example of "second object". An image object may be rephrased with an indicator.

Figure 7:
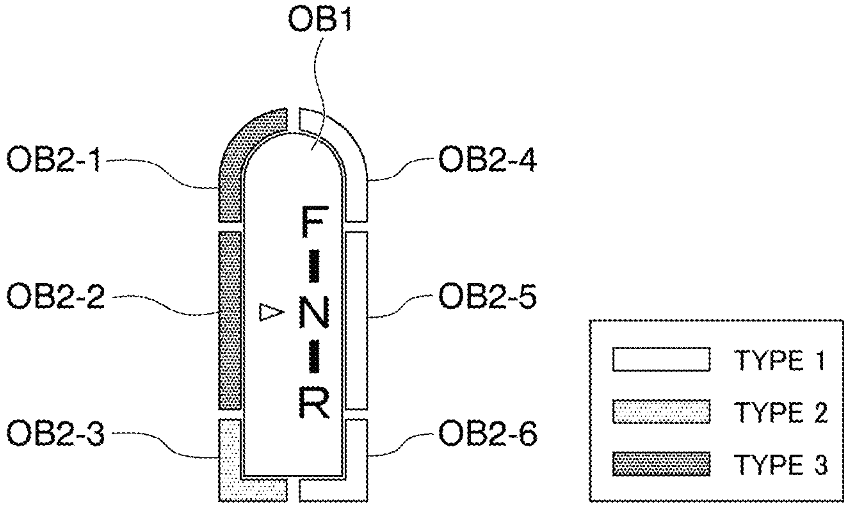
FIG. 7 is a diagram illustrating one example of a ship object and a virtual line object.

FIG. 7 is a diagram illustrating one example of the ship object OB1 and the virtual line object OB2. For example, a plurality of virtual line objects OB2-1 to OB2-6 may be displayed on an outer edge of the ship object OB1. The ship object OB1 may be an image of a watercraft S that has been actually imaged by the camera 10 or may be an icon, an animation, a symbol, or the like prepared in advance. Furthermore, a shift position of the watercraft S may be displayed on the ship object OB1. At least a front shift (F in the drawing), a neutral shift (N in the drawing), and a rear shift (R in the drawing) may be included in the shift position.

The display control unit 130 has the type (aspect) at the time of displaying the virtual line object OB2 to be different between a case in which a positional relation (a relative distance, a collision prediction time, or the like) between the watercraft S and an obstacle satisfies a predetermined condition and a case in which the positional relation does not satisfy the predetermined condition.

First, the display control unit 130 causes virtual line objects OB2-1 to OB2-6 of Type 1 to be displayed on an outer edge of the ship object OB1. Type 1 is a default type. A color of the virtual line object OB2 of Type 1, for example, is configured to be white that is inconspicuous, and a line of the virtual line object OB2, for example, is configured to have a standard thickness.

When the virtual line object OB2 of the default Type 1 is displayed, for example, for each of areas acquired by dividing a top view into four parts including front, rear, left, and right parts, success/no-success of a predetermined condition is assumed to be judged. In such a case, the display control unit 130 determines a type of the virtual line object OB2 corresponding to each area. For example, in a case in which an obstacle approaches from a left side when seen in an advancement direction of the watercraft S, in the area of the left side of the watercraft S, (i) the relative distance between the watercraft S and an obstacle becomes a predetermined distance or less or (iii) the collision prediction time between the watercraft S and the obstacle becomes a predetermined time or less.

The display control unit 130 changes types of the virtual line objects OB2-1, OB2-2, and OB2-3 disposed in an area of the left side of a watercraft S that an obstacle approaches, that is, on the left side of the ship object OB1 to Type 2 or 3 and, on the other hand, maintains the types of the virtual line objects OB2-4, OB2-5, and OB2-6 disposed in a an area of the left side of the watercraft S that the obstacle approaches, that is, on the right side of the ship object OB1 to be Type 1.

Type 2 is a type for more highlighted display of the virtual line object OB2 than that of Type 1. The color of the virtual line object OB2 of Type 2, for example, becomes yellow that is more conspicuous than white, and the line of the virtual line object OB2, for example, becomes thicker than that of Type 1.

Type 3 is a type for more highlighted display of the virtual line object OB2 than that of Type 2. The color of the virtual line object OB2 of Type 3, for example, becomes red that is more conspicuous than yellow, and the line of the virtual line object OB2, for example, becomes thicker than that of Type 2.

For example, in a case in which a positional relation (a relative distance, a collision prediction time, or the like) between a watercraft S and an obstacle does not satisfy any one of the first predetermined condition and the second predetermined condition, the display control unit 130 causes the virtual line object OB2 of default Type 1 to be displayed. More specifically, in a case in which the predetermined distance of (i) is set to 3 [m] as the first predetermined condition, the predetermined distance of (i) is set to 1 [m] as the second predetermined condition, and a relative distance between a watercraft S and an obstacle exceeds 3 [m], the display control unit 130 causes the virtual line object OB2 of default Type 1 to be displayed.

In addition, in a case in which a positional relation (a relative distance, a collision prediction time, or the like) between a watercraft S and an obstacle satisfies the first predetermined condition and does not satisfy the second predetermined condition that is more unlikely to be satisfied, the display control unit 130 causes the virtual line object OB2 of Type 2 to be displayed. More specifically, in a case in which the predetermined distances of (i) of the first predetermined condition and the second predetermined condition are set to the numerical values described above, and the relative distance between the watercraft S and the obstacle is 3 [m] or less and exceeds 1 [m], the display control unit 130 causes the virtual line object OB2 of Type 2 to be displayed.

In addition, in a case in which the positional relation (the relative distance, the collision prediction time, or the like) between the watercraft S and the obstacle satisfies both the first predetermined condition and the second predetermined condition, the display control unit 130 causes the virtual line object OB2 of Type 3 to be displayed. More specifically, in a case in which the predetermined distances of (i) of the first predetermined condition and the second predetermined condition are set to the numerical values described above, and the relative distance between the watercraft S and the obstacle is 1 [m] or less, the display control unit 130 causes the virtual line object OB2 of Type 3 to be displayed.

In this way, in a case in which the predetermined condition is divided into the first predetermined condition and the second predetermined condition, the display control unit 130 may determine the type of the virtual line object OB2 in accordance with satisfaction or non-satisfaction of each condition.

Figure 8:
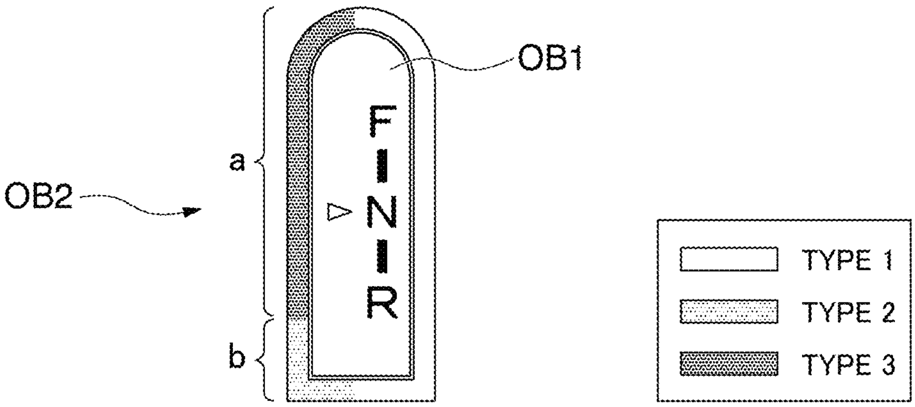
FIG. 8 is a diagram illustrating another example of a ship object and a virtual line object.

FIG. 8 is a diagram illustrating another example of the ship object OB1 and the virtual line object OB2. For example, the display control unit 130 may cause a virtual line object OB2 of one circular shape that is not partitioned at all to be displayed on an outer edge of the ship object OB1. In such a case, as in a and b illustrated in the drawing, the display control unit 130 may change the type of a partial area of the virtual line object OB2 of the circular shape.

Figure 9:
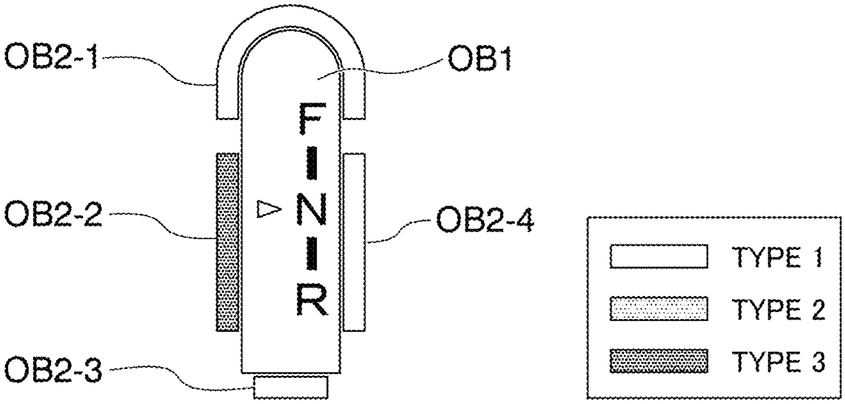
FIG. 9 is a diagram illustrating another example of a ship object and a virtual line object.
Figure 10:
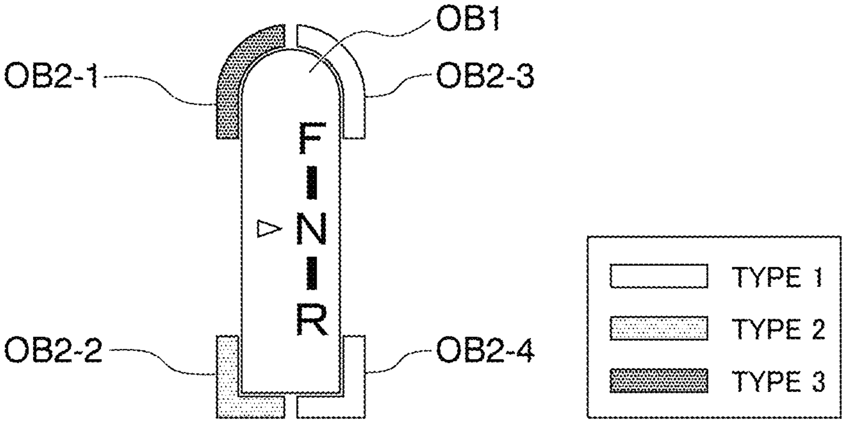
FIG. 10 is a diagram illustrating another example of a ship object and a virtual line object.

FIGS. 9 and 10 are diagrams illustrating other examples of a ship object OB1 and virtual line objects OB2. For example, the display control unit 130 may cause virtual line objects OB2 to be displayed in four places on a front side, a rear side, a right side, and a left side of the outer edge of a ship object OB1 or may cause virtual line objects OB2 of a “U” shape to be displayed in four places on a right front side, a left front side, a right rear side, and a left rear side of an outer edge of a ship object OB1. In this way, the virtual line objects OB2 are disposed at mutually-different positions on the outer edge of the ship object OB1.

Furthermore, the display control unit 130, in addition to or in place of the ship object OB1 and the virtual line objects OB2, may cause the display 20 to display other image objects. For example, the display control unit 130 may superimpose an image object representing a rudder angle of the outboard motor steering device 50 of the watercraft S (hereinafter, referred to as a rudder angle object OB4) as the other image object onto a top view. In addition, the display control unit 130 may superimpose the rudder angle object OB4 also onto an oblique view in addition to the top view. The rudder angle object OB4 is one example of “fourth object”.

Figure 11:
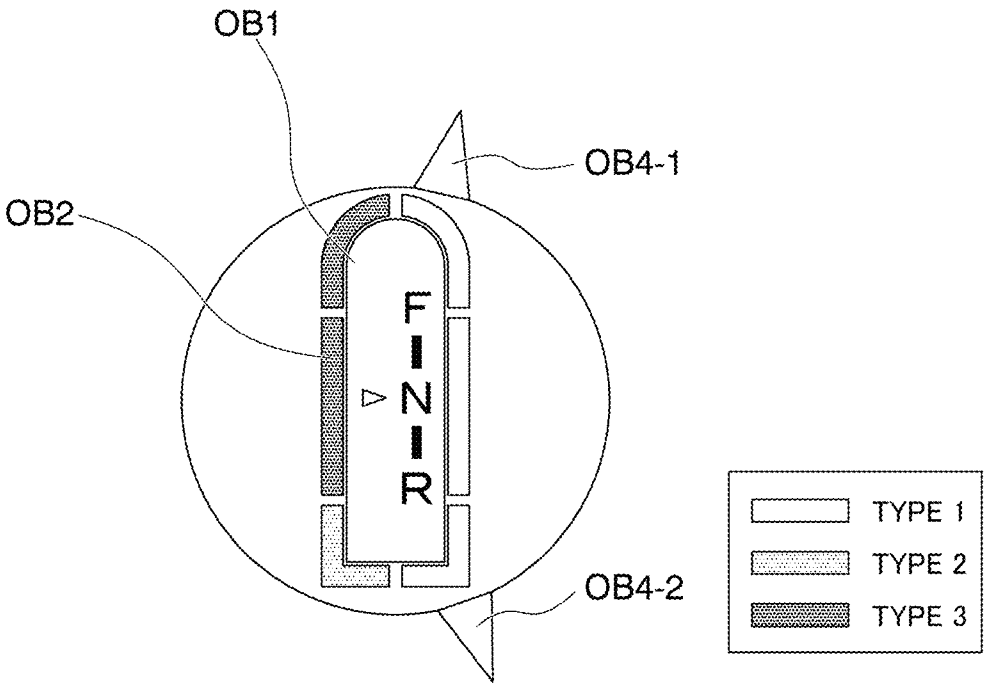
FIG. 11 is a diagram illustrating one example of a rudder angle object.

FIG. 11 is a diagram illustrating one example of the rudder angle object OB4. As illustrated in the drawing, the display control unit 130 disposes an image object with a circular shape in the vicinity of the ship object OB1 as the rudder angle object OB4 and causes a front rudder angle object OB4-1 representing a rudder angle of a side in front of the outboard motor steering device 50 and a rear rudder angle object OB4-2 representing a rudder angle of a side to the rear of the outboard motor steering device 50 to be displayed on the circumference thereof. The circle of the rudder angle object OB4 May 5 be either a perfect circle or an oval. In other words, the display control unit 130 causes the ship object OB1 and the virtual line object OB2 to be displayed on the inner side of the rudder angle object OB4 of the circular shape. In accordance with this, the entire objects become compact, and, even when those objects are superimposed onto a top view, a range in which a video of the top view is blocked becomes small, and thus a user’s visibility can be improved.

In addition, for example, the display control unit 130 may superimpose an image object representing an azimuth measured by the azimuth sensor 30 (hereinafter, referred to as an azimuth object CP), an image object representing a wind direction and a wind speed measured by the wind direction/wind speed sensor 40 (hereinafter, referred to as a wind direction/wind speed object WD), and the like onto a top view as other image objects. Furthermore, the display control unit 130 may superimpose the azimuth object CP and the wind direction/wind speed object WD onto also an oblique view in addition to the top view.

Figure 12:
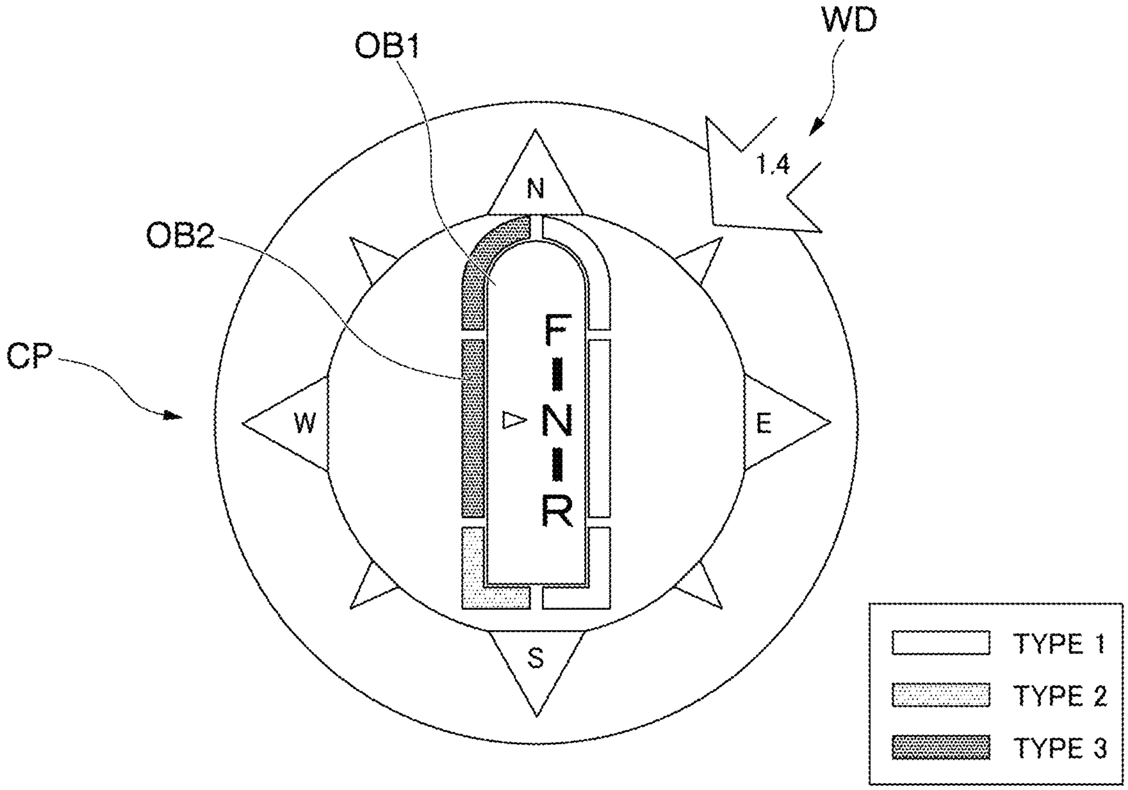
FIG. 12 is a diagram illustrating one example of an azimuth object and a wind direction/wind speed object.

FIG. 12 is a diagram illustrating one example of the azimuth object CP and the wind direction/wind speed object WD. As illustrated in the drawing, the display control unit 130 disposes an image object with a circular shape in the vicinity of the ship object OB1 as an azimuth object CP and further causes image objects representing azimuths such as the east, the west, the south, and the north to be displayed on the circumference thereof. In addition, the display control unit 130 causes an image object representing a wind direction and a wind speed for a watercraft S to be displayed on a further outer side of the azimuth object CP of the circular shape as a wind direction/wind speed object WD.

Furthermore, for example, the display control unit 130 may superimpose a distance marker OB3 onto an oblique view as the other image object. The distance marker OB3, similar to the virtual line object OB2, is an image object representing a positional relation between a watercraft S and an obstacle and is an image object representing a relative relation with an obstacle disposed at a position farther than the virtual line object OB2. In addition, the display control unit 130 may superimpose the distance marker OB3 also onto the top view in addition to the oblique view. The distance marker OB3 is one example of "third object". The distance marker OB3, typically, may be constantly displayed. In accordance with this, an operator can easily recognize a positional relation (for example, a relative distance) with an obstacle from a scale of the distance marker OB3 and can predict when the type (a color, a thickness, or the like) of the virtual line object OB2 is changed.

Figure 13:
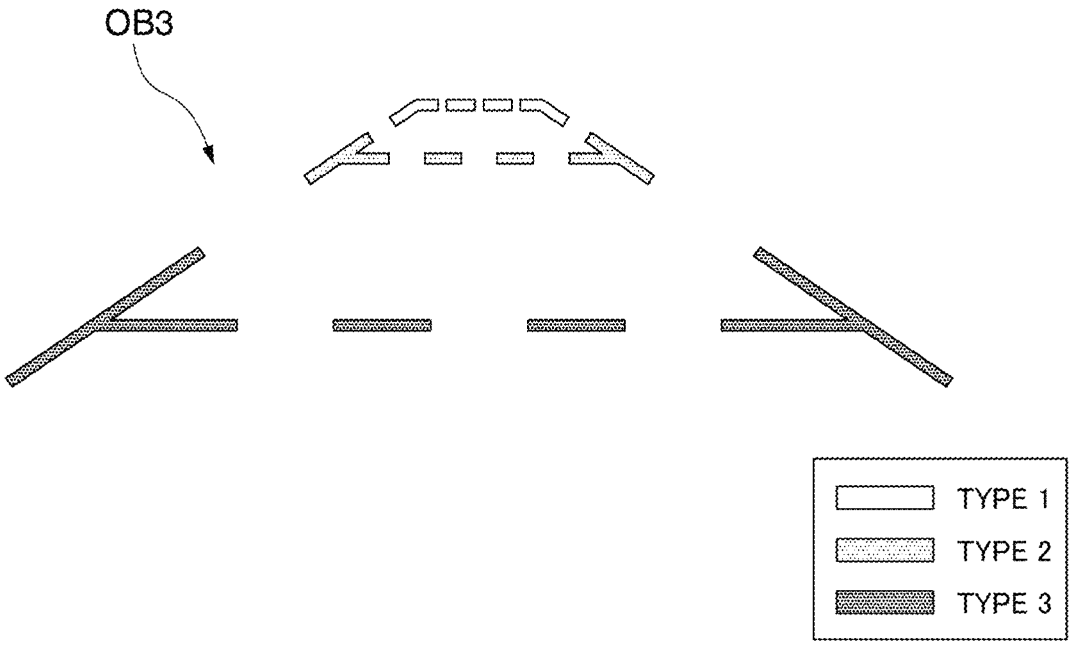
FIG. 13 is a diagram illustrating one example of a distance marker.

FIG. 13 is a diagram illustrating one example of the distance marker OB3. As illustrated in the drawing, in the distance marker OB3, up to a range 1 [m] away from a watercraft S is displayed in Type 3, a range from 1 [m] to 3 [m] is displayed in Type 2, and a range more than 3 [m] away therefrom is displayed in Type 1. In this way, similar to the virtual line object OB2, the type of the distance marker OB3 is determined in accordance with satisfaction/non-satisfaction of each condition.

In other words, in a case in which a positional relation (a relative distance, a collision prediction time, or the like) between a watercraft S and an obstacle satisfies a predetermined condition, the display control unit 130 causes more highlighted display of the distance marker OB3 than in a case in which the predetermined condition is not satisfied. In addition, in a case in which the positional relation between the watercraft S and the obstacle satisfies the second predetermined condition, the display control unit 130 performs more highlighted display of the distance marker OB3 than that in a case in which the positional relation between the watercraft S and the obstacle satisfies the first predetermined condition (display in Type 2 or 3). Furthermore, the distance marker OB3 may have a plurality of patterns in accordance with a water face. For example, the water face differs in a case in which the fuel is full and a case in which the fuel is not full. Similarly, the water face differs in a case in which the number of occupants is a maximum and a case in which the number of occupants is not the maximum. Thus, the display control unit 130 may have the size and the appearance of the distance marker OB3 to be different in accordance with the amount of remaining of fuel and the number of occupants (that is, in accordance with the water face).

Mode of Watercraft

In this embodiment, a plurality of modes are set in the watercraft S. For example, the display control unit 130 may cause the screen of the display 20 to transition in accordance with the mode of the watercraft S.

Figure 14:
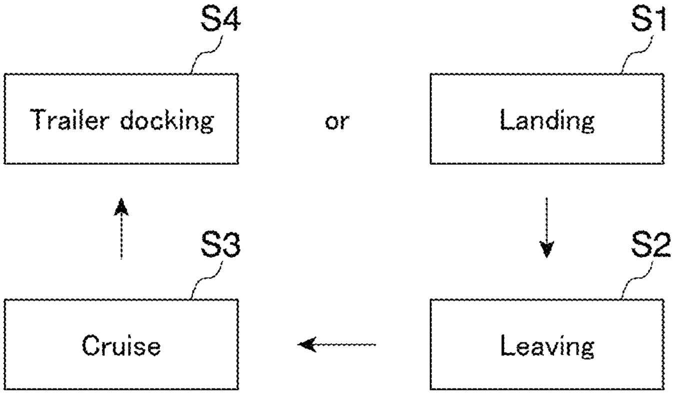
FIG. 14 is a diagram illustrating one example of a plurality of modes that can be taken by a watercraft.

FIG. 14 is a diagram illustrating one example of a plurality of modes that can be taken by the watercraft S. As illustrated in the drawing, a landing mode S1 in which the watercraft S performs landing, a leaving mode S2 in which the watercraft performs departure, a cruise mode S3 in which the watercraft S cruises, a trailer docking mode S4 in which the watercraft docks with a trailer, and the like may be included in the plurality of modes. For example, when the ignition of the watercraft S is on, the landing mode S1 is started. Then, a transition from the landing mode S1 to the leaving mode S2 is performed, a transition from the leaving mode S2 to the cruise mode S3 is performed, and a transition from the cruise mode S3 to the trailer docking mode S4 or the landing mode S1 is performed.

Transitions among these modes of the watercraft S (that is, the screens of the display 20) may be performed either manually or automatically. For example, in a case in which the display 20 is a touch panel, a transition among the modes of the watercraft S may be performed in accordance with an operation of an operator of the watercraft S on the display 20. In addition, in a case in which another input interface (for example, a switch, a button, or the like) other than a touch panel is included in the watercraft S, a transition among the modes of the watercraft S may be performed in accordance with an operator's operation on the other input interface. In addition, a transition among the modes of the watercraft S may be automatically performed in accordance with a positional relation (a relative distance, a collision prediction time, or the like), a shift position, or the like between the watercraft S and an obstacle.

Figure 15:
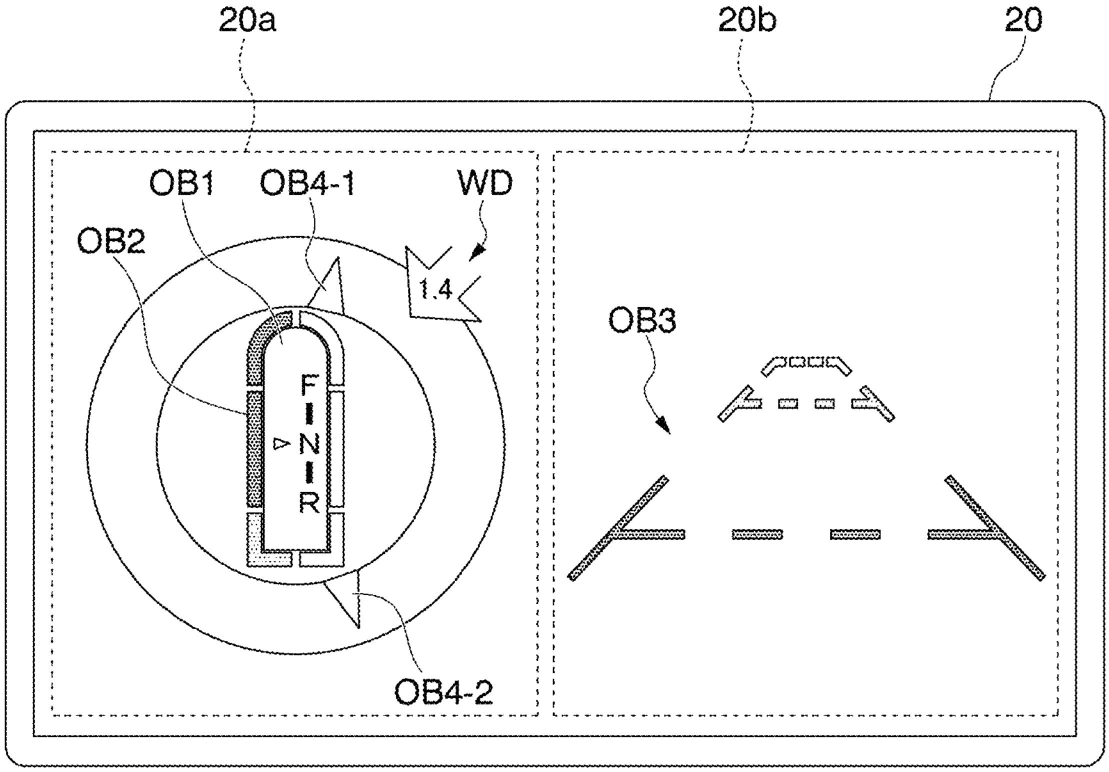
FIG. 15 is a diagram illustrating one example of a screen of a display under a landing mode.

FIG. 15 is a diagram illustrating one example of the screen of the display 20 under the landing mode S1. In a case in which the mode of the watercraft S is the landing mode S1, the display control unit 130 causes a top view, onto which the ship object OB1, the virtual line object OB2, the rudder angle object OB4, and the wind direction/wind speed object WD are superimposed, to be displayed in a first area 20*a* of the screen of the display 20. Furthermore, the display control unit 130 causes an oblique view, onto which the distance marker OB3 is superimposed, to be displayed in a second area 20*b* of the screen of the display 20.

The oblique view displayed in this second area 20*b* is an oblique view in which a direction, in which an obstacle of which a positional relation with the watercraft S satisfies a predetermined condition is present, is imaged among a plurality of oblique views. For example, in a case in which an obstacle satisfying a predetermined condition is present on the left side of the watercraft S, an oblique view of the left-side camera 10-4 is displayed in the second area 20*b*. Particularly, since the landing mode S1 is a mode in which the watercraft S performs landing, a quaywall or the like used for mooring the watercraft S is judged as an obstacle satisfying the predetermined condition, and, as a result, an oblique view in which the quaywall or the like is imaged is displayed in the second area 20*b*.

Figure 16:
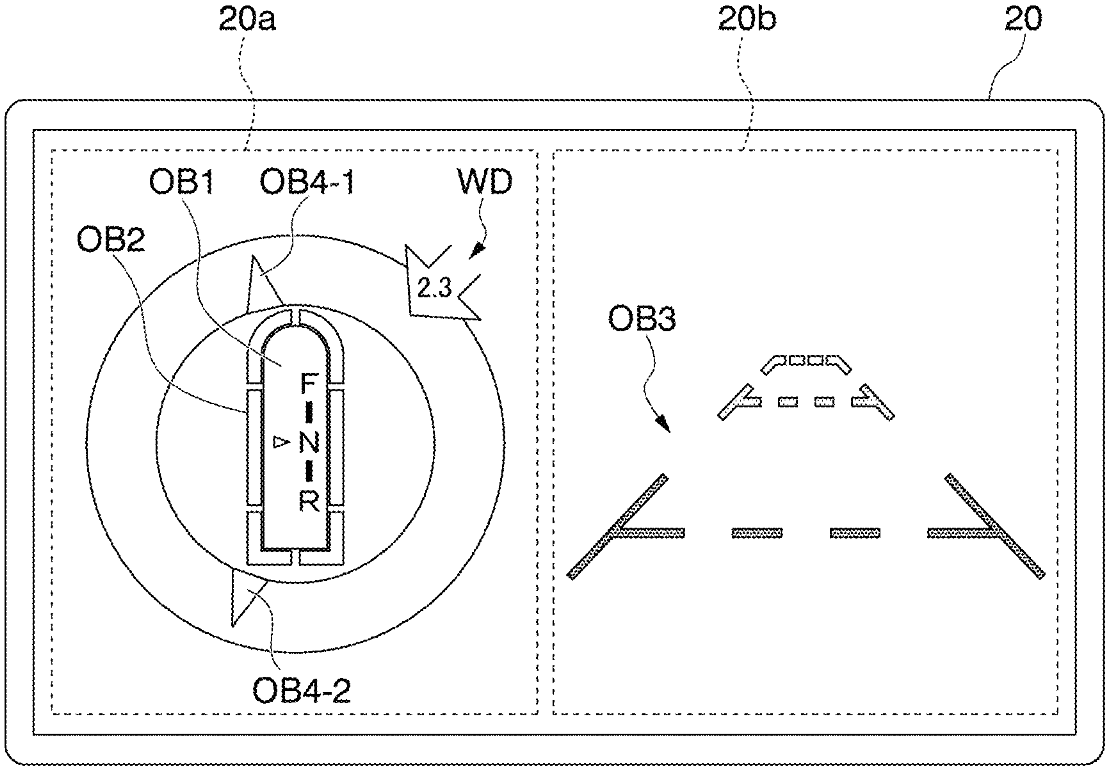
FIG. 16 is a diagram illustrating one example of a screen of a display under a leaving mode.

FIG. 16 is a diagram illustrating one example of the screen of the display 20 under the leaving mode S2. In a case in which the mode of the watercraft S is the leaving mode S2, similar to the landing mode S1, the display control unit 130 causes a top view, onto which the ship object OB1, the virtual line object OB2, the rudder angle object OB4, and the wind direction/wind speed object WD are superimposed, to be displayed in the first area 20*a* of the screen of the display 20. Furthermore, the display control unit 130 causes an oblique view, onto which the distance marker OB3 is superimposed, to be displayed in the second area 20*b* of the screen of the display 20.

Figure 17:
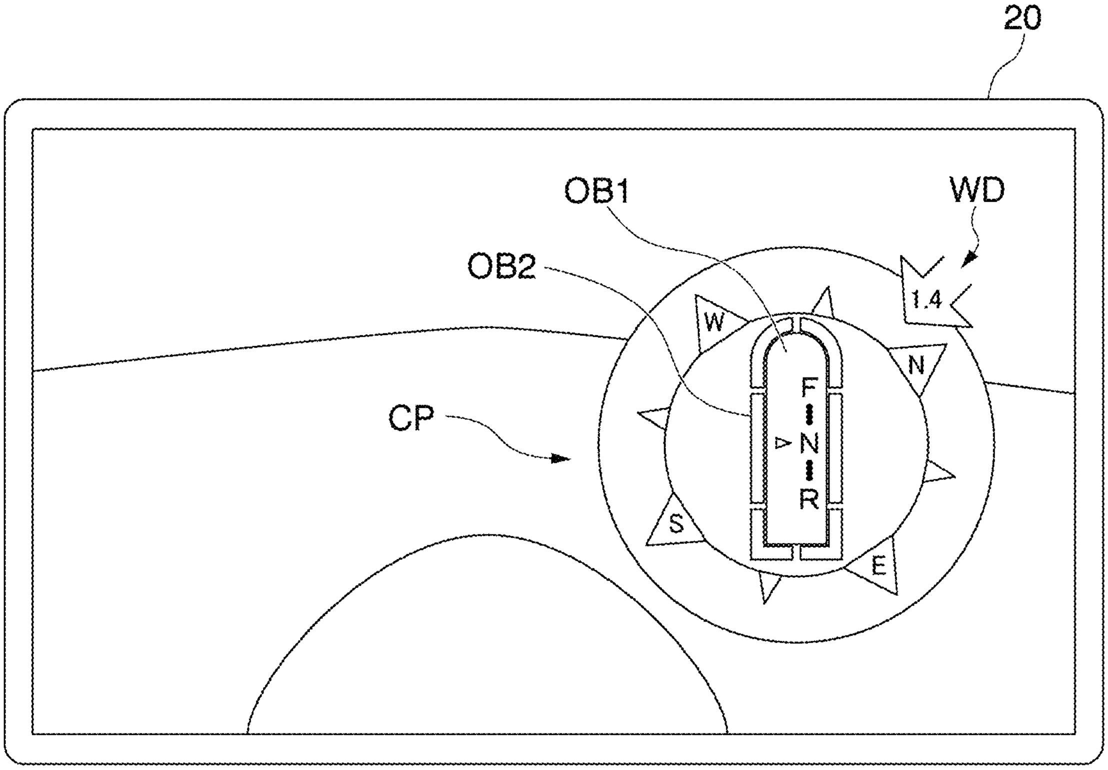
FIG. 17 is a diagram illustrating one example of a screen of a display under a cruise mode.

FIG. 17 is a diagram illustrating one example of the screen of the display 20 under the cruise mode S3. In a case in which the mode of the watercraft S is the cruise mode S3, the display control unit 130 causes an oblique view to be displayed on the entire screen of the display 20 in which a first area 20*a* and a second area 20*b* are aligned. For example, the ship object OB1, the virtual line object OB2, the azimuth object CP, and the wind direction/wind speed object WD are superimposed onto this oblique view. For example, under the cruise mode S3, in a case in which the shift position is a rear shift, an oblique view of the rear-side camera 10-3 is displayed on the entire screen of the display 20. On the other hand, under the cruise mode S3, in a case in which the shift position is a front shift, an oblique view of the front-side camera 10-1 is displayed on the entire screen of the display 20.

Figure 18:
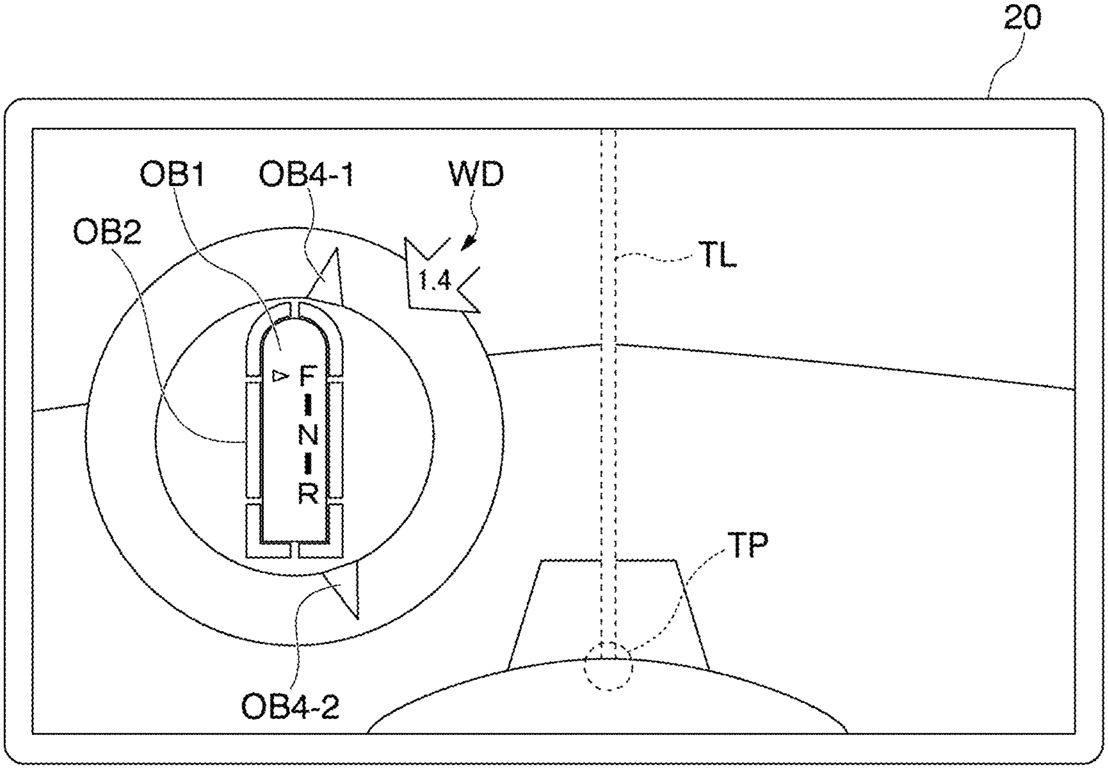
FIG. 18 is a diagram illustrating one example of a screen of a display under a trailer docking mode.

FIG. 18 is a diagram illustrating one example of the screen of the display 20 under the trailer docking mode S4. In a case in which the mode of the watercraft S is the trailer docking mode S4, the display control unit 130 causes an oblique view to be displayed on the entire screen of the display 20 in which the first area 20*a* and the second area 20*b* are aligned. For example, the ship object OB1, the virtual line object OB2, the rudder angle object OB4, and the wind direction/wind speed object WD are superimposed onto this oblique view. The oblique view displayed on the entire screen of the display 20 may be an oblique view of the rear-side camera 10-3. Furthermore, a center point TP of the rear end of the watercraft S, a reference line TL passing through the center point TP, and the like may be superimposed onto the oblique view. The center point TP and the reference line TL may be set as marks for docking the watercraft S to a trailer.

According to the embodiment described above, the operation support system 1, under the landing mode S1 or the leaving mode S2, causes an oblique view (one example of "first view") and a top view to be displayed on the display 20. At this time, the operation support system 1 superimposes the ship object OB1 (one example of "first object") and the virtual line object OB2 (one example of "second object") onto the top view. Furthermore, the operation support system 1 superimposes the distance marker OB3 (one example of "third object") onto the oblique view. Then, the operation support system 1 causes a type at least at the time of displaying the virtual line object OB2 to be different in a case in which a positional relation (a relative distance, a collision prediction time, or the like) between the watercraft S and the obstacle satisfies a predetermined condition and a case in which the positional relation does not satisfy the predetermined condition. More specifically, the operation support system 1 causes the virtual line object OB2 to be displayed in Type 2 or 3 in a case in which the positional relation between the watercraft S and the obstacle satisfies the predetermined condition and causes the virtual line object OB2 to be displayed in Type 1 in a case in which the positional relation between the watercraft S and the obstacle does not satisfy the predetermined condition.

Furthermore, the operation support system 1 superimposes the virtual line object OB2 of a type similar to the predetermined condition onto the oblique view. As described above, in a case in which the positional relation between the watercraft S and the obstacle satisfies the first predetermined condition, the virtual line object OB2 and the distance marker OB3 are displayed together in Type 2, and, in a case in which the positional relation satisfies the second predetermined condition, the virtual line object OB2 and the distance marker OB3 are displayed together in Type 3.

In this way, since an oblique view onto which various image objects are superimposed and a top view are displayed to be aligned on the same screen, an operator can intuitively recognize a positional relation between the watercraft S and the obstacle in each view. As a result, anyone can easily operate the watercraft S.

In addition, in the embodiment described above, although a top view has been described to be generated from an oblique view, the configuration is not limited thereto. For example, by causing a flying object (for example, a drone or the like) in which a camera is mounted to fly above the watercraft S, the watercraft S may be imaged from the flying object. The processing device 100 of the operation support system 1 may acquire an image captured from above using the flying object as a top view.

The embodiment described above can be expressed as below.

(Supplementary Note 1)

An operation support system including: a display mounted in a watercraft; a storage medium storing computer-readable instructions; and a processor connected to the storage medium, the processor executing the computer-readable instructions to: cause a first view that is an image of the vicinity of the watercraft and a second view that is an image of the vicinity of the watercraft of an angle different from that of the first view to be displayed on the display; superimpose a first object simulating the watercraft and one or a plurality of line-shaped second objects disposed in the vicinity of the first object onto the second view; superimpose a third object representing a positional relation between an obstacle in the vicinity of the watercraft and the watercraft onto the first view; cause a type at least at the time of displaying the second object to be different in a case in which the positional relation satisfies a predetermined condition and in a case in which the positional relation does not satisfy the predetermined condition; and superimpose the second object of a type similar to that of the predetermined condition represented by the third object onto the first view.

(Supplementary Note 2)

An operation support method using an operation support system including a display mounted in a watercraft, the operation support method including: causing a first view that is an image of the vicinity of the watercraft and a second view that is an image of the vicinity of the watercraft of an angle different from that of the first view to be displayed on the display; superimposing a first object simulating the watercraft and one or a plurality of line-shaped second objects disposed in the vicinity of the first object onto the second view; superimposing a third object representing a positional relation between an obstacle in the vicinity of the watercraft and the watercraft onto the first view; causing a type at least at the time of displaying the second object to be different in a case in which the positional relation satisfies a predetermined condition and in a case in which the positional relation does not satisfy the predetermined condition; and superimposing the second object of a type similar to that of the predetermined condition represented by the third object onto the first view.

While forms for performing the present invention have been described with reference to the embodiment, the present invention is not limited to such an embodiment at all, and various modifications and substitutions can be applied within a range not departing from the concept of the present invention.

What is claimed is:

1. An operation support system comprising:

a display mounted in a watercraft; and a processor configured to:

cause a first view to be displayed on the display, the first view being an oblique view of an image of the vicinity of the watercraft, cause a second view to be displayed on the display, the second view being of top view of an image of the vicinity of the watercraft of an angle different from that of the first view, superimpose a first object simulating the watercraft and a plurality of line-shaped second objects disposed in the vicinity of the first object onto the second view, the plurality of line-shaped second objects being respectively disposed at each of divided areas on an outer edge of the first object, superimpose a third object representing a positional relation between an obstacle in the vicinity of the watercraft and the watercraft onto the first view, the third object being an object having a first type indicating a first distance and a second type indicating a second distance which is shorter than the first distance, cause a type of display at least at the time of displaying the plurality of line-shaped second objects to be different depending on whether the positional relation satisfies predetermined conditions or the positional relation does not satisfy the predetermined conditions, determine whether each of the each of divided areas satisfies the predetermined conditions, superimpose the plurality of line-shaped second objects of the second type, onto the second view, in a case in which a first condition is satisfied, the first condition being a condition where a relative distance between the watercraft and the obstacle is the second distance, and superimpose the plurality of line-shaped second objects of the first type, onto the second view, in a case in which the first condition is not satisfied.

2. The operation support system according to claim 1, wherein the relative distance between the watercraft and the obstacle being a predetermined distance or less is included in the predetermined conditions, and wherein the processor further configured to perform a more highlighted display of the plurality of line-shaped second objects, in a case in which the relative distance is the predetermined distance or less than in a case in which the relative distance exceeds the predetermined distance.

3. The operation support system according to claim 1, wherein a reference distance, which is a distance based on a speed of the watercraft, being a predetermined distance or less is included in the predetermined condition, and wherein the processor further configured to perform a more highlighted display of the plurality of line-shaped second objects, in a case in which the reference distance is the predetermined distance or less than in a case in which the reference distance exceeds the predetermined distance.

4. The operation support system according to claim 1, wherein a collision prediction time between the watercraft and the obstacle being a predetermined time or less is included in the predetermined condition, and wherein the processor further configured to perform a more highlighted display of the plurality of line-shaped second objects, in a case in which the collision prediction time is the predetermined time or less than in a case in which the collision prediction time exceeds the predetermined time.

5. The operation support system according to claim 1, wherein the first predetermined condition and a second predetermined condition that is more unlikely to be satisfied than the first predetermined condition are included in the predetermined conditions, and wherein the processor further configured to perform a more highlighted display of the plurality of line-shaped second objects, in a case in which the positional relation satisfies the second predetermined condition than in a case in which the positional relation satisfies the first predetermined condition.

6. The operation support system according to claim 1, wherein the processor further configured to cause a line-shaped second object of the plurality of line-shaped second objects to be displayed on at least one of:

a lateral side of the first object, in front of the first object, or behind the first object.

7. The operation support system according to claim 6, wherein a left side and a right side are included in the lateral side.

8. The operation support system according to claim 1, wherein the first view acquired by imaging a side in front of the watercraft, the first view acquired by imaging a side to the rear of the watercraft, and the first view acquired by imaging a lateral side of the watercraft are included in the first view.

9. The operation support system according to claim 1, wherein the processor further configured to cause the display to display the first view in which a direction, in which the obstacle of which the positional relation with the watercraft satisfies the predetermined condition is present, is imaged among a plurality of the first views.

10. The operation support system according to claim 1, wherein the processor further configured to superimpose a fourth object with a circular shape representing a rudder angle of a propeller of the watercraft onto the second view and cause the first object and the second object to be displayed inside the fourth object.

11. The operation support system according to claim 1, wherein, in a case in which the positional relation satisfies the predetermined condition, the processor further configured to change a color of a line-shaped second object of the plurality of line-shaped second objects to a predetermined color corresponding to the predetermined condition.

12. The operation support system according to claim 1, wherein, in a case in which the positional relation satisfies the predetermined condition, the processor further configured to change a line of a line-shaped second object of the plurality of line-shaped second objects to a predetermined line corresponding to the predetermined condition.

* * * * *